United States Patent [19]
Gutjahr et al.

[11] 4,257,783
[45] Mar. 24, 1981

[54] METHOD OF AND A DEVICE FOR SEPARATING PAINT RESIDUALS AND SOLVENTS FROM THE EXHAUST AIR OF A PAINT SPRAY CHAMBER

[75] Inventors: Rolf Gutjahr, Hirschlanden; Satpal Bhatnagar, Rosswag, both of Fed. Rep. of Germany

[73] Assignee: Otto Dür Anlagenbau GmbH, Stuttgart, Fed. Rep. of Germany

[21] Appl. No.: 910,022

[22] Filed: May 26, 1978

[30] Foreign Application Priority Data

May 27, 1977 [DE] Fed. Rep. of Germany ....... 2723988

[51] Int. Cl.³ .................. B01D 53/08; B01D 50/00; B03C 3/10
[52] U.S. Cl. .......................... 55/61; 55/77; 55/96; 55/97; 55/99; 55/114; 55/116; 55/124; 55/181; 55/198; 55/228; 55/243; 55/290; 55/291; 55/301; 55/316; 55/317; 55/353; 55/410; 55/418; 55/421; 55/466; 55/473; 55/474; 55/525; 98/115SB; 118/61; 118/326; 118/DIG. 7
[58] Field of Search .............. 98/115 SB; 55/61, 76, 55/77, 96, 97, 99, 116, 198, 208, 228, 242, 243, 316, 317–318, 351, 353, 354, 390, 474, 60, 196, 114, 124, 181, 290, 291, 301, 525, DIG. 10, 410, 418, 421, 466, 473; 118/326, 61, DIG. 7

[56] References Cited

U.S. PATENT DOCUMENTS

| | | | |
|---|---|---|---|
| 1,895,618 | 1/1933 | Fedeler | 55/242 X |
| 1,913,885 | 6/1933 | Jordahl | 55/242 X |
| 2,222,828 | 11/1940 | Guthrie | 55/196 |
| 2,232,561 | 2/1941 | Richards | 98/115 SB X |
| 2,470,339 | 5/1949 | Claussen et al. | 55/61 X |
| 2,486,877 | 11/1949 | Ransburg et al. | 55/116 |
| 2,723,949 | 11/1955 | McCausland | 55/99 X |
| 2,992,895 | 7/1961 | Feustel et al. | 55/99 X |
| 3,395,972 | 8/1968 | Hardison | 98/115 SB X |
| 3,405,508 | 10/1968 | Peters et al. | 55/390 X |
| 3,479,146 | 11/1969 | Hochman et al. | 55/316 X |
| 3,853,514 | 12/1974 | Post | 55/242 |
| 4,135,894 | 1/1979 | Himes et al. | 55/243 X |

FOREIGN PATENT DOCUMENTS

| | | | |
|---|---|---|---|
| 2115590 | 7/1972 | France | 55/243 |
| 2201914 | 5/1974 | France | 55/242 |

*Primary Examiner*—Kathleen J. Prunner
*Attorney, Agent, or Firm*—Michael J. Striker

[57] ABSTRACT

An arrangement for separating paint residuals and solvents from the exhaust air of a paint spray chamber comprises a device for blowing a stream of supply air through the spray chamber to take along exhaust air containing paint and solvent particles, a filtering conveyor located below the chamber for intercepting from the exhaust air paint particles and discharging continuously the same, and a second conveyor arranged below the filtering conveyor and adapted for receiving and discharging a layer of adsorptive material that intercepts solvent particles remaining in the filtered exhaust air.

67 Claims, 5 Drawing Figures

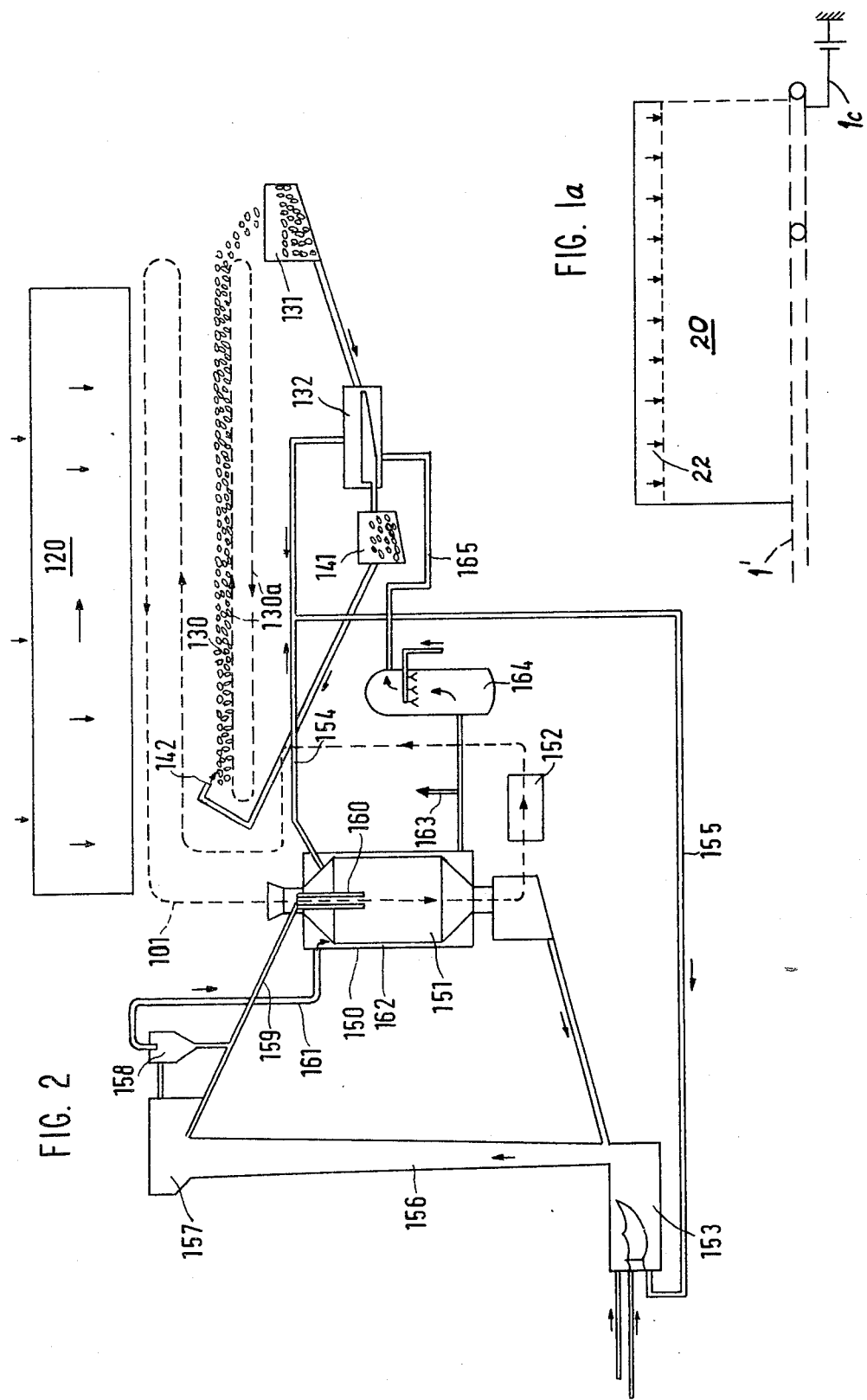

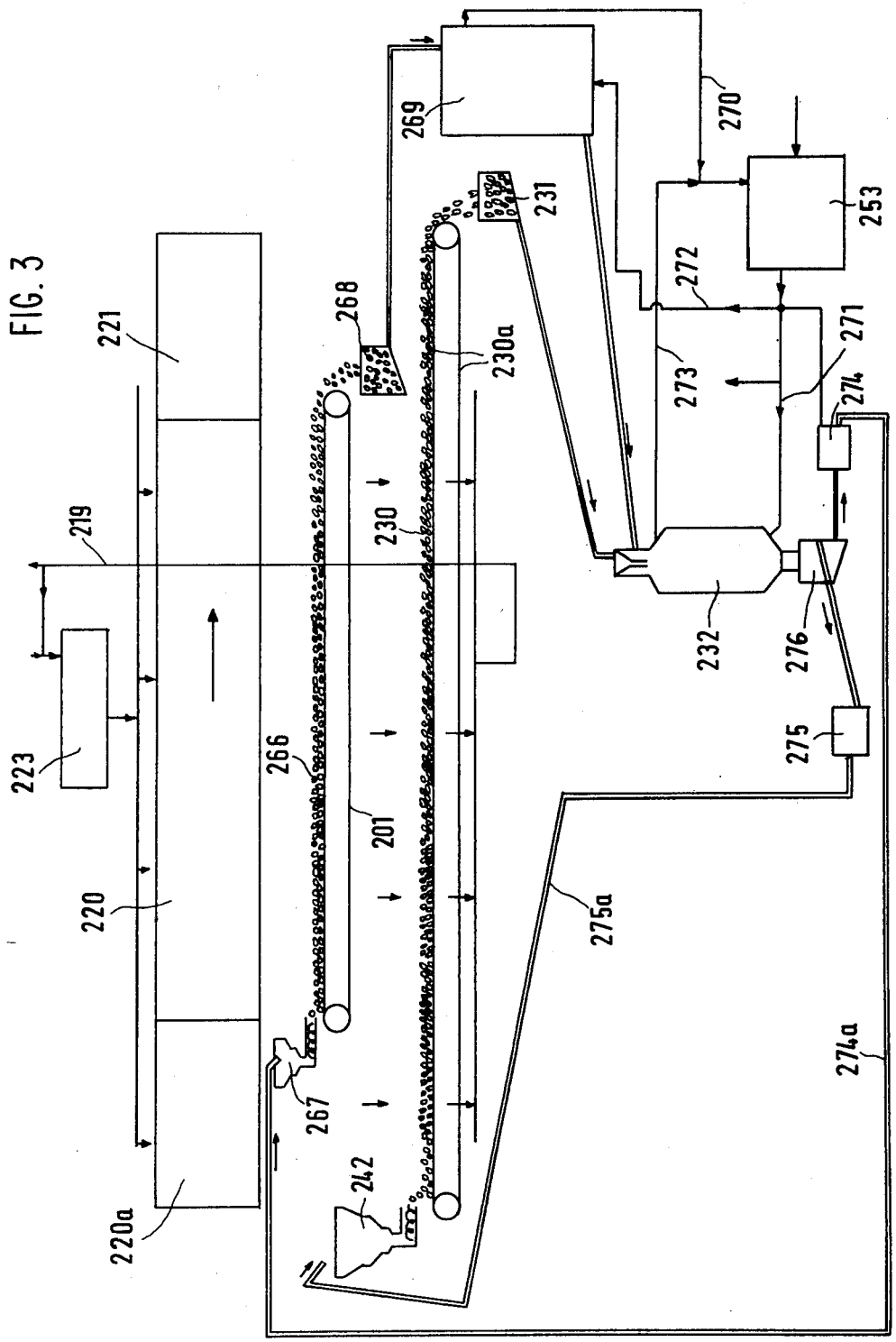

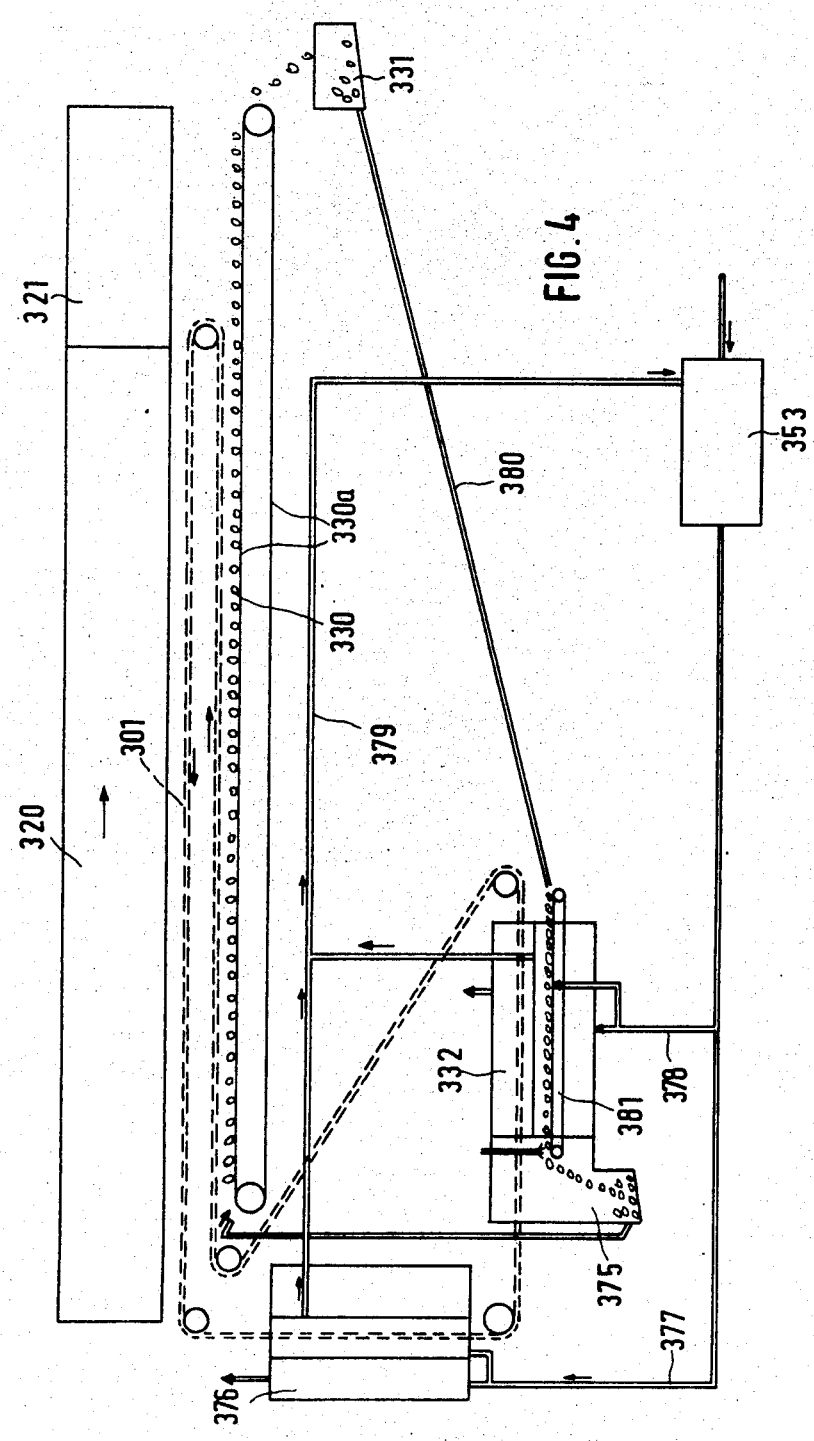

METHOD OF AND A DEVICE FOR SEPARATING PAINT RESIDUALS AND SOLVENTS FROM THE EXHAUST AIR OF A PAINT SPRAY CHAMBER

BACKGROUND OF THE INVENTION

This invention relates generally to air decontamination and more specifically, it relates to a method of and a device for separating paint residuals and solvent particles contained in a stream of the exhaust air discharged from paint spray chambers or similar treatment stations, especially from those that are used for painting metal parts such as car bodies and the like.

The term "paint" is here used to designate materials such as lacquer, varnish or other painting materials having similar properties and that can be removed from an exhaust gas in similar manner as a lacquer. The solvent can be contained in the paint or it can be additional added in the course of the method of this invention to dissolve the paint residuals. The method of this invention is also suitable for removing other contaminating substances suspended in the exhaust air even if such additional substances are not mentioned explicitly.

In painting shops, the paint residuals and solvents deposited from the paint mist are conventionally washed out by means of wet precipitators or separators. Nonetheless, the degree of separation depends among others on the pressure difference in the separating system, on the pollution of the separating water and on the effectiveness of used coagulation chemicals. Conventional prior-art devices and methods have a relatively limited effect and therefore are unsatisfactory. Solvents contained in the exhaust air are not separated at all and are freely discharged in the outer atmosphere and cause considerable pollution. Economically feasible methods for purifying the exhaust air from paint spray chambers so as to remove both the paint residuals and the paint dissolving particles suspended in the air, have not yet been devised.

SUMMARY OF THE INVENTION

It is therefore a general object of the present invention to overcome the aforementioned disadvantages.

More particularly, it is an object of the invention to separate from exhaust air discharged from a treatment station particularly from a paint spray chamber, the paint residuals and/or solvents contained and suspended in the exhaust air.

Another object of this invention is to provide a device for purifying exhaust air from paint spray chambers that is economic in operation and can be installed at relatively small costs.

Still another object of this invention is to provide a method and device that makes it possible to discharge in the outer atmosphere almost completely purified exhaust air.

Furthermore, an object of this invention is to provide a method and device that separates paint residuals and solvents from the used air with minimum waste of operational materials and energy.

In keeping with these objects, and others which will become apparent hereafter, one feature of the invention resides, in a method that comprises the steps of directing a substantial part of the used air in the paint spray chamber through a filtering conveyor adapted for intercepting and discharging paint residuals from the air stream and that solvent particles remaining in the stream are intercepted in an adsorptive material, especially activated carbon, and the saturated adsorptive material is continuously or intermittently discharged from the stream of the exhaust air.

It is known from the prior art how to separate paint solvents contained in exhaust air from a paint spray chamber by directing the exhaust air into a stationary, so-called fixed layer adsorber in which solvent particles and also other contaminating substances are neutralized. Such known "fixed layer" adsorbers are arranged mostly in columns. Their disadvantage, however, is the fact that they are extremely costly and require an excessive installation space so that the application of such adsorbent columns has proved to be uneconomical.

In contrast, in the method and device according to this invention the paint residuals as well as solvent particles contained in the paint or applied additionally into the exhaust air, are intercepted and discharged continuously or at frequent intervals. Moreover, the separate solvents can be accumulated and recirculated for repeated use in the preceding decontaminating processes.

According to another feature of the method of this invention, conveying means employed for removing the paint residuals are subject to a cleaning process and periodically returned into the stream of the exhaust air for renewed interception of paint residuals. The cleaning is effected chemically by using solvents or in a mechanical process using for example sand jets and the like.

According to another feature of the method of this invention, the adsorptive material after being saturated with solvents removed from the exhaust air is subject to a desorption process in which the solvents separated from the adsorption material are recycled for repeated adsorption of solvent particles from the exhaust air stream. In this manner it is achieved that the solvent is completely and without waste removed from the exhaust air and the waste of adsorption material such as activated carbon, is limited to minimum.

Furthermore, in a further elaboration of the method and device for separation of polluting particles from the exhaust air discharged from spray chambers, the removal of paint residuals and solvents from the stream of exhaust air from the treatment chamber is still further improved so that complete separation of the paint and solvent particles takes place and maximum recycling of those particles is made possible and a particularly high degree of efficiency is attained.

A particularly important feature of this invention is in the provision of conveyors for filtering and discharging the paint particles aw well as for adsorbing the solvent particles contained in the exhaust air, the conveyors being preferably in the form of endless conveying belts. Another important feature of this invention is in the provision of a filtering layer on the conveyor band for intercepting and accumulating the paint residuals.

By separating carbon dust from the dried activated carbon it is possible to use this carbon dust as heating or fuel material for other uses such as for example for heating a steam generator or boiler for desorption water; the dried activated carbon used as adsorption material is preferably returned on the conveyor band for adsorbing solvent particles from the exhaust air stream.

If the conveyor band for the paint residuals is cleaned by means of sand jets, the sand is cleaned by burning off the stripped-off paint and the remaining purified sand is recycled in a sand blasting process. In this blasting process the combustion gases can be used for pressurizing the separated sand in order to generate the sand jets. The separation of the sand is made by means of centrifugal forces in one or more stages.

According to still another feature of this invention alumina or aluminum oxide is used for intercepting paint residuals; alumina is discharged on the endless conveying band and upon intercepting the paint residuals dripping from the spray chamber it is discharged into a furnace for burning off the paint particles. Thereupon it can be used for desorption of an adsorption material such as activated carbon and reintroduced into contact with the exhaust air stream from the treatment chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1a is a modification of the filtering band of FIG. 1; and FIGS. 2-4 show respectively different modifications of the device of FIG. 1.

DESCRIPTION OF THE PREFERRED EMBODIMENTS

Figure 1:
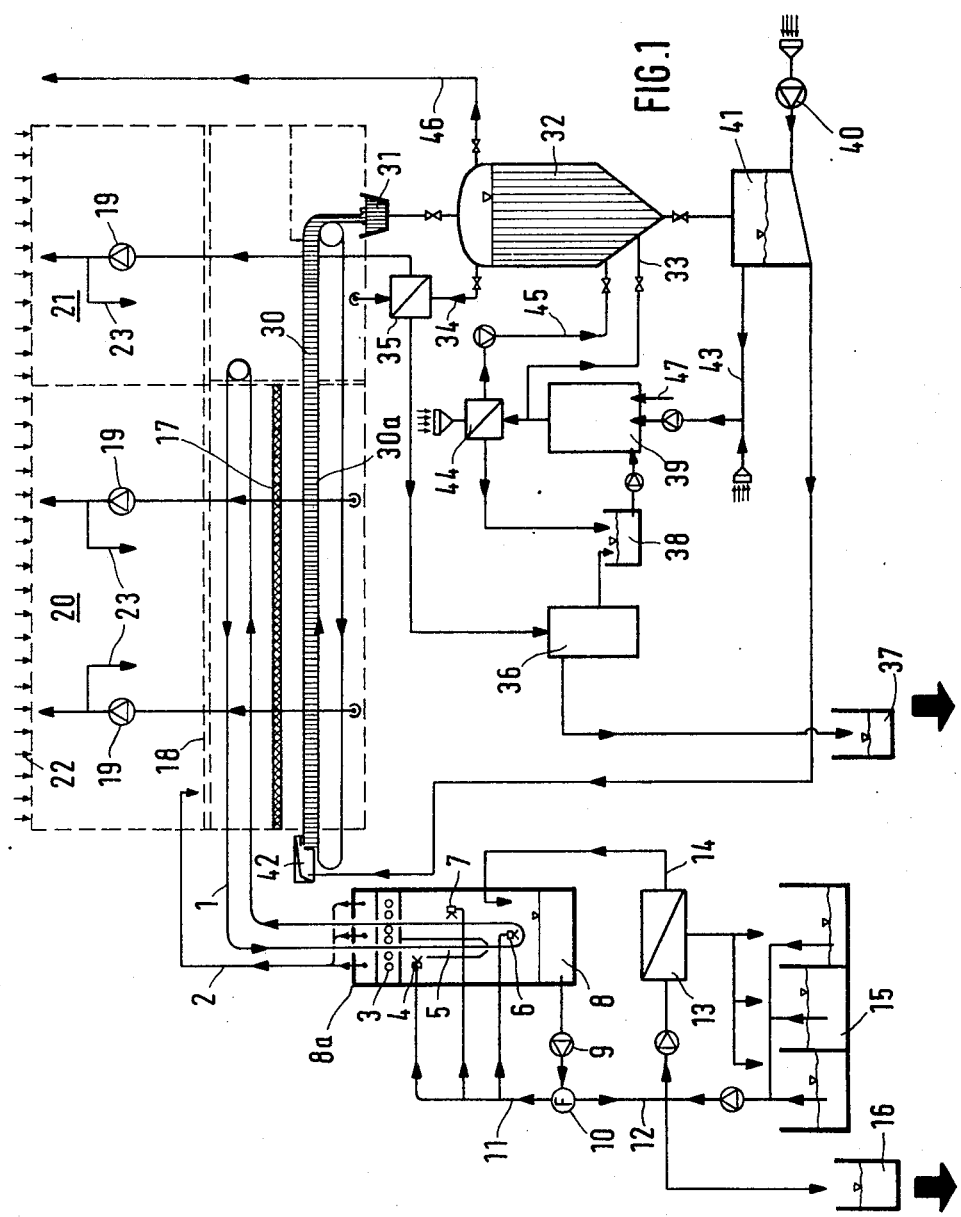
Fig. 1 is a schematic representation of one embodiment of the device according to this invention.

Referring firstly to FIG. 1 reference numeral 20 denotes a paint spray chamber in which different objects such as parts of car bodies for example are sprayed with paint. After the spraying operation the coated objects are transferred to an evaporation zone 21 communicating with the spray chamber. Both the spray chamber 20 and the evaporation zone 21 are divided into an upper space where the actual spraying operation takes place and into a lower space serving for inspecting the chamber and the evaporation zone. The upper space is separated from the lower space by a grate 18. The paint drops or paint particles dripping from the paint mist resulting in the spray chamber 20 are taken along by a stream of supply air 22 driven into the chambers 20 and 21 through inlet openings provided in the ceiling of the chambers and the mixture is discharged as exhaust air through the grate 18 against a circulating endless filtering band 1. If needed, electric potential can be applied via conductor 1c shown in FIG. 1a at least to the lower run of the filter band 11 to assist in the precipitation of the residual paint droplets. If the exhaust air stream passing the filtering conveyor band 1 has not been completely freed from the paint mist, the remainder of the paint particles are intercepted by a pressure distributing device 17 in the form of a bed or layer of granular particles. The device 17, however, serves primarily for equalizing the pressure of the exhaust air stream so that the underlying circulating second endless filter band in the form of a conveyor band 30a carrying adsorption material 30 preferably in the form of a continuously deposited layer of activated carbon, is slowly and uniformly penetrated by the stream of pressure equalized exhaust air. In passing through the conveyor band 30a the exhaust air transfers particles of solvent contained therein into the adsorbing material that is continuously discharged fo further processing as it will be explained below. After passing this stage, the exhaust air has been completely purified and is subsequently sucked by (schematically illustrated) outlet air system 19 and discharged into the outer atmosphere or is reintroduced through return conduits 23 as supply air into the chamber 20 or evaporation zone 21.

Paint remainders or residual paint particles deposited on the filtering band 1 are transferred by the filtering band 1 into a washing chamber 8a in which it is soaked in the same solvent as used in spraying. In the shown embodiment, the cleaning process of the conveyor 1 is initiated by rinsing the latter by means of solvent jetted through nozzles 4 in a first treatment zone of the washing chamber. The used paint solvent is collected in a flooding container 5 located under the nozzles 4. The filtering conveyor 1 is then advanced through the flooding container 5 and during this movement the still adherent paint is once more intensively soaked and softened. In a subsequent treatment zone, the conveyor band 1 is rinsed again by solvent jetted through intermediate nozzle 6 so that by the action of the dynamic pressure of the washing liquid the soaked paint deposits are further released from the filtering band. Before the treated part of the conveyor belt 1 emerges from the washing chamber in the direction to the spray chamber, a final rinsing is made by solvent jetted through nozzles 7.

The total amount of the washing liquid admitted into the cleaning process and including the dissolved residual paint and solvents, is collected in a collecting container 8. A circulation pump 9 sucks the washing liquid mixture and delivers it to a filtering device 10 that partially separates the solvent and the paint. The purified solvent after its separation from the paint is delivered through conduit 11 back to the nozzle system in the washing station 8a whereas paint separated in the filter is fed through conduit 12 to an additional filtering station 13 that serves for separating the last remainders of solvents contained in the paint and for concentrating the solvent. The resulting filtrate is returned through conduit 14 into the collecting container 8 so that no solvent is wasted.

In order that the acquired paint might be concentrated according to a program determined by particular operational conditions, a storing container 15 is provided from which the paint is supplied for additional filtration in the filtering station 13 and this filtering process can be repeated until the desired thickness or concentration of the paint is achieved. The concentrated paint is delivered to container 16 and therefrom discharged from the system.

Another possibility of paint recovery is shown in FIG. 1a where the filter band 1 and the grate 18 are constructed as a single unit' where the aforedescribed cleaning process is carried out.

Solvent vapors created in the washing chamber 8a are cooled in a cooling device 3 and condensed. In addition, to relieve pressure in the washing chamber 8a, the solvent vapor can be discharged through the chamber 8a via pressure relieving conduit 2 into the spray chamber 20 or into the evaporation zone 21 where it is sucked off by the stream of supply air 22 passing through the spray chamber.

Solvent contained in the stream of exhaust air is adsorbed by the activated carbon when the exhaust air loaded with the solvent particles is passing through the activated carbon layer 30. The layer 30 is continuously discharged into a dosing container or tub 31 that is preferably equipped with a vibrator and a dosing device and therefrom it is fed into a desorption container 32 in which it is by a continuous or intermittent operation desorbed so as to be recycled for another exposure to the exhaust air stream.

In the embodiment shown in FIG. 1 the desorption of the activated carbon is effected by means of steam. Steam is introduced into the desorption container 32 via a conduit 33. The desorbate (solvent mixed with steam) is fed from the desorption container 32 via a conduit 34 into a condenser 35 that also admits exhaust air from the evaporation zone 21. The condensate formed in the condenser 35 is fed to a rectification device or column 36, where the solvent and water are separated. For example, upon fractionization in the column 36, the solvent is accumulated in container 37 and made ready for recycling whereas the condensed water is discharged in a water reservoir 38. From this reservoir water is pumped to a steam generator or boiler 39 in which it is heated and delivered as hot steam via conduit 33 into desorption container 32 for desorbing activated carbon container therein. Carbon dust remaining after the desorption of the activated carbon in the desorption container 32 is discharged into a carbon dust trap at the top of separator 4 and therefrom it is delivered via conduit 43 to boiler 39 where it serves as a supplemental fuel for the primary heating fuel supplied via conduit 47. Hot water from boiler 39 is supplied to a heat exchanger 44 which draws in fresh air that, via conduit 45, is fed into the desorption container 32 for drying the activated carbon. Activated carbon after being freed from carbon dust is discharged on the bottom of the separator 41 and delivered pneumatically by means of fans 40 to a loading station 42 that cooperates with the conveyor 30a to deposit thereon a continuous layer of reactivated carbon 30. The station 42 acts at the same time as a dosing device to dischrge the activated carbon in a predetermined quantity. The device as illustrated schematically in FIG. 1 makes it possible to remove practically all paint residuals and solvents contained in the exhaust air stream coming from the spray chamber and thus producing practically pure outlet air that through the outlet system 19 or 46 can be dischrged into the outer atmosphere without causing pollution. At the same time, due to the recycling of auxiliary materials such as additional solvents or activated carbon, the consumption of such auxiliary materials is reduced to minimum or almost to zero. Also by reusing waste materials considerable amount of energy is saved. By utilizing heat generated for desorption and additional drying processes and also by recycling purified water it is possible to further increase the effectiveness of the device.

In the embodiment according to FIG. 2, the last two digits in reference numerals correspond to the like reference numerals in FIG. 1. Filtering conveyor 101 in the form of a continuously circulating conveyor serving for intercepting paint remnants dripping from the spray chamber 120, is advanced through the inner container 151 of a doubled walled cleaning container 150. In the container 151 jets of sand heated to about 350° to 700° C. remove the paint from the conveyor band surface and the clean conveyor part is advanced through a cooling device 152 to the lower part of the spray chamber 120. The mixture of sand and paint remnants removed from the conveyor 101 is transported, via a vibrator if needed, to a combusiton chamber 153 into which contaminating substances escaping from the container 151 of the cleaning container are also supplied via conduits 154 and 155. The mixture of paint remnants, sand and contaminating substances is burned in chamber 153 by means of supplied fuel and air, and the resulting fumes as well as the sand are sucked up through a conduit 156 into a separator 157 having the form of a cyclone and thereafter are sucked into a second cyclone-like separator 158. The cyclone-like separators separate sand from fumes whereby sand is moved by pressure resulting in cyclones 157 and 158 and fed via conduit 159 into nozzles 160 acting as a sand jet blower; the funes are fed via conduit 161 into the interspace 162 of the cleaning container 150 and are employed for heating the inner container 151 of the cleaning container. Fumes purified from paint particles and other contaminants, are discharged from the interspace 162 through conduit 163 into the outer atmosphere or are fed via a spray tower 164 acting as a cooler and mixer with water spray, and therefrom are supplied via conduit 165 into the desorption container 132 to act as a desorption agent for regenerating used adsorption material 130 (such as activated carbon saturated with solvent). The used adsorption material is discharged from the circulating conveyor band 130a into a storing tube 131 and after desorption in container 132 is fed through a separator 141 again to loading point 142 for being redeposited on the conveyor 130a. A pressure equalizing device for example in the form of a gravel layer can be again arranged if desired, between the two conveyors 101 and 130a. Fumes employed as desorption agent in the regenerator or desorption container 132 in the form of a whirling shaft reactor, are supplied via conduit 155 into the combustion chamber 153 for burning contaminating substances contained therein as it has been described before.

The adsorption material (activated carbon) can also be regenerated by sand instead of fumes.

In the embodiment shown in FIG. 3 In instances where similar apparatus is used, the last two digits of reference numerals correspond to reference numerals of like parts in FIG. 1. In this device the residual paint from the spray station 220 is deposited on a fill or layer 266 of alumina $Al_2O_3$. This alumina layer is discharged on the circulating conveyor band 201 at the loading station 267 and at the opposite end of the conveyor the alumina with the intercepted paint is discharged into a collecting container 268 from which it is supplied to a furnace 269 such as a whirl shaft furnace for example. In the furnace the paint particles are expelled from the alumina and, in a partially combusted condition, are supplied via conduit 270 into a combustion chamber 253; the separated alumina is fed into a desorption container in the form of an oven 232 such as a shaft furnace, for example, where it is mixed with adsorption material 230 such as activated carbon delivered from the conveyor band 230a and collecting container 231 and in the oven 232 the mixture is heated by fumes delivered via conduit 271 from combustion chamber 253. At the same time, conduit 272 supplies the fumes into heating furnace 269 for heating the same. In the heating oven 232 the adsorption material is freed from solvent particles that via conduit 273 are supplied to combustion chamber 253 for being burned. Alumina and adsorption material are separated from one another in a separator such as for example a vibrating sieve 276 whereupon alumina is supplied via a cooler 274 and a conduit 274a to the loading station 267; the adsorption material is supplied via cooler 275 and a conduit 275a to the loading station 242. Exhaust air purified from paint mist and solvent particles is fed through return conduit 219 to air supply 223 and therefrom it is forced through the spray chamber 220 or through chamber 220a (used for preliminary cleaning) and/or through the evaporation zone 221.

In the modification illustrated in FIG. 4 component parts corresponding to those in the preceding embodiments are designated by identical last two digits in corresponding reference numerals. Similarly as in the preceding examples, the treatment chamber 320 has an evaporation zone 321 and also a stream of supply air (not shown) is blown from inlet openings at the ceiling of the chamber past conveyors 301 and 330a. This air stream takes along paint particles as well as solvent particles and the paint particles are intercepted by a steel wool layer provided on conveyor 301. Paint particles attached to the steel wool are delivered by the conveyor 301 through a pyrolyzing device 376 where it is subject to heat treatment and to the influence of acids. A layer of adsorption material 330 that is continuously laid on the conveyor 330a is continuously discharged into a tub 331 and therefrom fed through conduit 380 into desorption container 332 where it is also exposed to heat treatment. The desorption container 332 is preferably constructed as a whirl shaft furnace having radiation traps for transferring heat by radiation. Combustion products generated within burner 353 are fed through conduits 377 and 378 both into the pyrolyzer 376 and into desorption container 332 and through conduit 379 are returned to the burner 353.

The lower conveyor 330a conveying the continuously deposited adsorption material or if needed also aluminum oxide and the like, extends below the evaporation zone and discharges the adsorption layer 330 (activated carbon) after its saturation with solvent particles contained in the exhaust air stream from chamber 320 and zone 321, into the collecting tub (carbon collecting tub) 331 from which the adsorption material is fed via a chute 380 on an additional conveyor band 381 circulating in the desorption container 332. The adsorption material on conveyor 381 is relieved from adsorbed solvent particles and the latter are fed together with fumes through conduit 379 into burner 353 where they are burned. Adsorption material regenerated by the desorption process is cooled in cooler 375 and is returned on conveyor band 330a.

It will be understood that each of the elements described above, or two or more together, will also find a useful application in other types of constructions differing from the types described above.

While the invention has been illustrated and described as embodied in specific embodiments of the device for separating paint residuals and solvents from exhaust air of a spray chamber, it is not intended to be limited to the details shown, since various modifications and structural changes may be made without departing in any way from the spirit of the present invention. For instance, the device of this invention is applicable in existing devices of this kind that can be converted into a device according to this invention by a relatively simple reconstruction.

What is claimed as new and desired to be protected by Letters Patent is set forth in the appended claims:

1. A method of separating paint residuals and solvent particles contained in the exhaust air in a paint spray chamber, comprising the steps of blowing a stream of said exhaust air through filtering means adapted for intercepting paint residuals, thereafter passing said air through an adsorption layer of activated carbon for removing solvent particles therefrom; continuously discharging the paint filtering means together with the intercepted paint residuals and the adsorption layer together with the adsorbed solvent particles and simultaneously supplying fresh filtering means and a fresh adsorption layer to said stream; exposing the discharged paint filter means to a cleaning process for removing the paint residuals; exposing the discharged adsorption layer to a desorption process in which the adsorbed solvent particles are separated from the activated carbon; separating carbon dust resulting during the desorption process from the activated carbon and applying the carbon dust as a fuel in a steam generator for providing steam used in the desorption process; and returning the cleaned filtering means and activated carbon obtained in said desorption process into said stream of exhaust air.

2. A method as defined in claim 1, wherein said filtering means is arranged on a first continuously circulating conveyor and said adsorption layer is deposited on a second continuously circulating conveyor.

3. A method as defined in claim 2, wherein said cleaning process includes the removal of said paint residuals from said first conveyor by means of solvents.

4. A method as defined in claim 3, wherein the solution of said paint residuals in said solvents resulting in the cleaning process is subject to a separation process.

5. A method as defined in claim 4, wherein said separation process includes filtration for producing a purified solvent filtrate, said filtrate being returned into the cleaning process.

6. A method as defined in claim 5, further including the step of relieving the pressure of solvent vapors in said cleaning process by sucking out the excessive vapors by means of said stream of exhaust air.

7. A method as defined in claim 3, wherein said first conveyor is first rinsed by a spray of solvent, thereupon passes through a wet bath in the solvent and thereupon is rinsed again in the solvent.

8. A method as defined in claim 2, wherein said cleaning process includes a mechanical removal of said paint residuals from said first conveyor.

9. A method as defined in claim 8, wherein paint residuals from said filtering conveyor are removed by jets of sand.

10. A method as defined in claim 9, wherein the paint residuals and sand mixture is exposed to a combustion process.

11. A method as defined in claim 10, wherein fumes generated in the combustion process are used for forming the sand jets.

12. A method as defined in claim 10, wherein the mixture of sand and fumes generated in the combustion process is separated by centrifugal forces.

13. A method as defined in claim 10, wherein fumes, generated in the combustion process, containing solvent and other contaminating particles are returned into the combustion process.

14. A method as defined in claim 10, wherein sand is used for desorption of the adsorption material.

15. A method as defined in claim 14, wherein the filtering conveyor is exposed to a cooling process, after the paint residuals have been removed therefrom.

16. A method as defined in claim 1, wherein said filtering means is granulated alumina continuously deposited on said filtering conveyor to intercept paint residuals from said stream of exhaust air.

17. A method as defined in claim 16, wherein the cleaning process comprises subjecting used alumina after interception of paint residuals to a heating process to separate paint particles, the separated paint particles being thereupon burned in a combustion process.

18. A method as defined in claim 17, wherein fumes generated in the combustion process are used for directly heating the separated alumina granules.

19. A method as defined in claim 18, wherein the heated alumina granules together with fumes from the combustion process are used for heating saturated adsorption material in the desorption process.

20. A method as defined in claim 19, wherein granular alumina after precipitation and utilization in the heating and desorption process is returned into the stream of exhaust air.

21. A method as defined in claim 19, wherein the purified granulated filtering material as well as the purified adsorption material are separated mechanically, thereupon cooled and returned into the stream of exhaust air.

22. A device for separating paint particles and solvent particles contained in the exhaust air in a paint spray chamber, comprising means for blowing supply air through said chamber to take along exhaust air loaded with paint particles and solvent particles in said chamber; a filtering conveyor carrying a filter material and arranged in the path of said exhaust air stream to intercept paint particles contained in said air stream and an adsorption conveyor covered with adsorption material for intercepting solvent particles from said air stream, said filtering conveyor and said adsorption conveyor being operable for discharging said filtering material and said adsorption material together with the intercepted paint and solvent particles, desorption means cooperating with said adsorption conveyor to receive adsorption material loaded with the solvent particles, said desorption means reactivating in a heating process the adsorption material while separating said solvent particles from said adsorption material; said filtering conveyor and said adsorption conveyor each having a receiving end and a discharging end; a loading station arranged at the receiving end of said adsorption conveyor for receiving the reactivated adsorption material from said desorption means and discharging the same on said adsorption conveyor and a container arranged at the discharging end of said adsorption conveyor for receiving therefrom the adsorption material saturated with the solvent particles and discharging the same in said desorption means; said adsorption material being activated carbon, and said desorption means including a desorption container and a separator for separating carbon dust from the reactivated carbon; and a steam generator connected to said desorption container for feeding steam into said desorption container, said steam generator having means for burning the carbon dust separated in said carbon dust separator and directed to said steam generator.

23. A device as defined in claim 22, wherein said filtering conveyor and said adsorption conveyor, each is in the form of a continuously circulating conveyor band.

24. A device as defined in claim 23, further including a cleaning station for removing paint particles from the filtering conveyor.

25. A device as defined in claim 24, wherein said cleaning station includes a washing chamber for washing said filtering conveyor by a solvent liquid admitted thereto, said filtering conveyor is continuously passed through the interior of said washing chamber.

26. A device as defined in claim 25, wherein said washing chamber includes a container for collecting the solvent liquid, pumping means for discharging said solvent liquid from said collecting container, a flooding container through which a flow of the discharged solvent liquid and said filtering conveyor are circulated and further includes preliminary spray nozzles for rinsing said filtering conveyor prior to its entry into said flooding container, and supplementary spray nozzles for rinsing said conveyor after its exit from the flooding container.

27. A device as defined in claim 26, further including filtering means for separating paint and solvent in the discharged solvent liquid.

28. A device as defined in claim 27, wherein said filtering conveyor forms a grate for said spray chamber.

29. A device as defined in claim 28, further including pressure equalizing means disposed between said filtering conveyor and said adsorption conveyor, said air stream passing through said pressure equalizing means.

30. A device as defined in claim 24, wherein said cleaning station includes means for directing sand jets on said filtering conveyor.

31. A device as defined in claim 30, further including a combustion chamber for combusting paint particles separated by said sand jets.

32. A device as defined in claim 31, further including a sand separator cooperating with fumes from said combustion chamber to form said jets of sand in said directing means.

33. A device as defined in claim 32, wherein the sand separator includes at least one cyclone separator.

34. A device as defined in claim 33, wherein the cleaning station for cleaning said filtering conveyor includes a double walled reactor container defining an inner space in which said conveyor is subject to cleaning by said sand jets and an intermediate space heated by fumes from said combustion chamber.

35. A device as defined in claim 34, wherein the desorption container is constructed as a whirling reactor.

36. A device as defined in claim 22, further including a condenser disposed so as to receive steam mixed with the solvent separated in said desorption container, a rectifier coupled to said condenser for separating the solvent from water, and conduit means for feeding the separated water into said steam generator.

37. A device as defined in claim 36, further including means for applying electric potential to said filtering conveyor to assist in interception of said paint particles.

38. A device as defined in claim 22, wherein said filtering conveyor supports a layer of alumina for intercepting said paint particles.

39. A device as defined in claim 38, including a loading station arranged at the receiving end of said filtering conveyor and a collecting station arranged at the discharging end of said filtering conveyor to receive used alumina.

40. A device as defined in claim 39, further comprising a furnace for heating granular alumina and for partially burning the intercepted paint deposited on said alumina, and a combustion chamber for burning solvent particles separated in said desorption container.

41. A device as defined in claim 40, further including conduits for supplying fumes from said combustion chamber into said desorption container.

42. A device as defined in claim 41, wherein said granular alumina having the intercepted paint partially burnt therefrom in said furnace is fed into said desorption container so as to be mixed with said adsorption material and further including means for separating purified granular alumina from purified adsorption material and means for recycling respective purified materials.

43. A device as defined in claim 22, wherein part of said filtering conveyor is thermally treated in said desorption container.

44. A device as defined in claim 43, wherein the desorption container includes radiation traps and is supplied by hot fumes from a combustion chamber.

45. A device as defined in claim 44, wherein said filtering conveyor is directed through a pyrolyzing device, said pyrolyzing device being heated and sealed against surrounding atmosphere.

46. A device as defined in claim 45, wherein said pyrolyzing device is heated by hot fumes from said combustion chamber.

47. A device as defined in claim 22, wherein said filtering conveyor is provided with a layer of steel wool for intercepting the paint particles.

48. A device as defined in claim 22, wherein said filtering conveyor forms a grate of said spray chamber.

49. A device a defined in claim 22, further including pressure equalizing means disposed between said filtering conveyor and said adsorption conveyor, said air stream passing through said pressure equalizing means.

50. A method of separating paint residuals and solvent particles entrained in the exhaust air in a paint spray chamber, comprising the steps of blowing a stream of said exhaust air through filtering means adapted for intercepting paint residuals and through an adsorption layer of activated carbon for removing solvent particles therefrom; discharging the filtering means together with the intercepted paint residuals and adsorption layer together with the adsorbed solvent particles and simultaneously supplying fresh filtering means and a fresh adsorption layer to said stream; exposing the discharged adsorption layer to a desorption process so as to reactivate the carbon such that the adsorbed solvent particles are separated therefrom; separating carbon dust resulting during the desorption process from the reactivated carbon and applying the carbon dust as a fuel in a steam generator for heating fresh air used in the desorption process; and returning the reactivated carbon into said stream of exhaust air.

51. A method as defined in claim 50, wherein said stream of exhaust air is first directed through said filtering means to separate paint residuals and thereupon is directed through said adsorption layer to remove solvent particles therefrom.

52. A method as defined in claim 51, wherein said filtering means is a first continuously circulating conveyor and said adsorption layer is deposited on a second continuously circulating conveyor.

53. A method defined in claim 52, wherein said paint residuals are removed from said first conveyor by means of solvents.

54. A method as defined in claim 53, wherein the solution of said paint residuals in said solvents is subject to a separation process.

55. A method as defined in claim 51, wherein the pressure of said stream of exhaust air after its passage through said filtering means is equalized and thereupon the equalized exhaust air is passed through said adsorption layer.

56. A method of removing solvent particles from an air stream comprising the steps of passing said stream through an adsorption layer of activated carbon which adsorbs the solvent particles, discharging the adsorption layer from the air stream, exposing the activated carbon of said adsorption layer to a desorption process in which the adsorbed solvent particles are separated from the activated carbon; separating carbon dust resulting during the desorption process from the activated carbon and applying the carbon dust as a fuel in a steam generator for providing steam used in the desorption process; and returning the activated carbon obtained in said desorption process into said stream of exhaust air.

57. A device for removing solvent particles from an air stream comprising a conveyor covered with adsorbing material for intercepting the solvent particles from the air stream, desorption means cooperating with said conveyor to receive adsorption material loaded with the solvent particles, said desorption means reactivating in a heating process the adsorption material while separating said solvent particles from said adsorption material; said conveyor having a receiving end and a discharging end; a loading station arranged at the receiving end of said conveyor for receiving the reactivated adsorption material from said desorption means and discharging the same on said conveyor and a container arranged at the discharging end of said conveyor for receiving therefrom the adsorption material saturated with the solvent particles and discharging the same in said desorption means; said adsorption material being activated carbon, and said desorption means including a desorption container and a separator for separating carbon dust from the reactivated carbon; and a steam generator connected to said desorption container for feeding steam into said desorption container, said steam generator having means for burning the carbon dust separated in said carbon dust separator and directed into said steam generator.

58. A device as defined in claim 57, further including a condenser connected to said desorption container to condense steam and solvent separated in said desorption container and directed to the condenser, a rectifier coupled to said condenser for separating the solvent from water, and conduit means for feeding the separated water into said steam generator.

59. A device for separating paint particles and solvent particles contained in the exhaust air in a paint spray chamber, comprising means for blowing supply air through said chamber to take along said exhaust air loaded with paint particles and solvent particles in said chamber; a filtering conveyor arranged in the path of said exhaust air stream to intercept paint particles contained in said air stream and an adsorption conveyor arranged in the path of said stream behind said filtering conveyor and being covered with an adsorption layer of activated carbon for intercepting solvent particles from said air stream, said filtering conveyor and said adsorption conveyor being operable for discharge together with the intercepted paint and solvent particles, each of said conveyors being in the form of a continuously circulating conveyor band; a cleaning station cooperating with a portion of said filtering conveyor to remove paint deposits therefrom; a desorption container cooperating with said adsorption conveyor to receive the adsorption layer loaded with solvent particles, said desorption container reactivating in a heating process the adsorption layer while separating said solvent particles from said adsorption layer; a separator separating the carbon dust from the reactivated carbon; and a steam generator connected to said desorption container for feeding steam into said desorption container and having means for burning the carbon dust separated in said carbon dust separator.

60. A device as defined in claim 59, wherein said cleaning station includes a washing chamber for washing said filtering conveyor by a solvent liquid admitted thereto, said filtering conveyor is continuously passed through the interior of said washing chamber.

61. A device as defined in claim 60, wherein said washing chamber includes a flooding container through which a flow of solvent liquid is circulated and further includes preliminary spray nozzles for rinsing said filtering conveyor prior to its entry into said flooding container, and supplementary spray nozzles for rinsing said conveyor after its exit from the flooding container.

62. A device as defined in claim 61, further including filtering means for separating paint and solvent in said circulated solvent liquid.

63. A device as defined in claim 59, wherein said filtering conveyor forms a grate for said spray chamber.

64. A device as defined in claim 59, further including pressure equalizing means disposed between said filtering conveyor and said adsorption conveyor, said air stream passing through said pressure equalizing means.

65. A device as defined in claim 59, wherein each of said conveyors has a receiving end and a discharging end, and further including a loading station arranged at the receiving end of said adsorption conveyor for receiving the reactivated adsorption layer from said desorption container and for discharging the same on said adsorption conveyor, and a container arranged at the discharging end of said adsorption conveyor for receiving therefrom the adsorption layer saturated with the solvent particles and discharging the same in said desorption means.

66. A device as defined in claim 59, further including a condenser connected to said desorption container to condense steam and solvent separated in said desorption container and directed to the condenser, a rectifier coupled to said condenser for separating the solvent from water, and conduit means for feeding the separated water through said steam generator.

67. A device as defined in claim 59, further including means for applying electric potential to said filtering conveyor to assist in interception of said paint particles.

* * * * *